United States Patent

Brenes

[11] Patent Number: 5,881,998
[45] Date of Patent: Mar. 16, 1999

[54] HALF PROFILE SLOT VALVE

[76] Inventor: Arthur Brenes, 5855 Jensen Rd., Castro Valley, Calif. 94546

[21] Appl. No.: 892,501

[22] Filed: Jul. 14, 1997

[51] Int. Cl.[6] .................................................. F16K 31/122
[52] U.S. Cl. .......................... 251/335.3; 251/62; 251/204
[58] Field of Search .............................. 251/335.1, 335.3, 251/62, 203, 204

[56] References Cited

U.S. PATENT DOCUMENTS

| | | | |
|---|---|---|---|
| 3,038,692 | 6/1962 | Holmes | 251/204 |
| 3,086,745 | 4/1963 | Natho | 251/62 |
| 4,431,159 | 2/1984 | Stubbs | 251/335.3 |
| 5,626,324 | 5/1997 | Nakamura et al. | 251/204 |

OTHER PUBLICATIONS

Brochure for '22000 Series, Stainless Steel Rectangular Valves,'High Vacuum Apparatus Manufacturing, Inc.: Hayward, pp. 1–6. 1996.

*Primary Examiner*—A. Michael Chambers
*Attorney, Agent, or Firm*—Flehr Hohbach Test Albritton & Herbert

[57] ABSTRACT

A slot valve (10) comprising a valve housing (12) defining a valve chamber (14) and having a valve gate (34) movable to seal off a central opening (30). An actuator assembly (46) includes a piston component (70, 72) and a cylinder component (60), and a pair of inner telescoping actuators (108), which define inner working chambers (120). Wear rings (124, 126, 128) engage guide surfaces that are isolated from valve chamber (14) by means of a bellows shield (90). The guide surfaces are positioned at least partially along the length of the bellows shield (90), within the second working chamber (104) of the actuator, so as to decrease the height of the actuator.

17 Claims, 7 Drawing Sheets

HALF PROFILE SLOT VALVE

BACKGROUND OF THE INVENTION

1. Field of the Invention

The present invention pertains to vacuum valves used in modular integrated applied processing systems and, more particularly, to slot valves, also known as rectangular valves, which provide vacuum seals between integrated processing modules of the type used to fabricate silicon wafer chips.

2. Related Art

My co-pending patent application, entitled "Bellows Driver Slot Valve," filed Jul. 14, 1997, Ser. No. 08/892,505, includes a discussion of design criteria for vacuum valves and prior art vacuum valves currently used. The slot valve of the present invention seeks to achieve many of the advantages of the bellows driven slot valve disclosed therein—compact design, narrow profile, quiet efficient operation, and low particulate accumulation at the sealing surface of the valve. My co-pending patent application, entitled "Half Profile Gate Valve," filed Jul. 14, 1997, Ser. No. 08/892,506 discloses a gate valve that also achieves the advantages of compact design, narrow profile, and low height, which reduces the area required for mounting of the valve between fabricating equipment and auxiliary components. These two co-pending applications are incorporated herein as part of the disclosure of the present invention.

SUMMARY OF THE INVENTION

Briefly described, the slot valve of the present invention comprises a valve housing that defines a valve chamber with a central opening, a valve gate movable within the valve chamber from a first position away from the central opening to a second position closing the central opening, and an actuator assembly for moving the valve gate between its first and second positions. The actuator assembly includes a cylinder component and a piston component having a piston slidably movable within the cylinder component and a piston rod extending out one end of the cylinder component and connected to the valve gate. The piston component and the cylinder component define a first working chamber above the piston for moving the piston component in a first direction, and a second working chamber below the piston and adjacent the piston rod. The actuator assembly further includes an inner actuator within the second working chamber for moving the piston component in a second direction. The actuator assembly also including guide surfaces for guiding the piston rod along a linear path and an expandable bellows shield within the second working chamber for isolating the valve chamber from the guide surfaces.

According to an aspect of the invention, the guide surfaces are part of the inner actuator and extend along at least a portion of the length of the bellows shield. In this manner, the height of the actuator is greatly reduced, by up to approximately 50%. The guide surfaces are positioned in the second working chamber, which is designed around the bellows shield, rather than above it, in order to reduce actuator height.

Preferably, the inner actuator includes a telescoping cylinder actuator that defines an inner working chamber that is sealed from the bellows shield. In this embodiment, the guide surfaces are comprised of the side walls of the telescoping cylinder actuator. The telescoping cylinder actuator includes at least two cylinder sections, one of which is secured to an end wall of the cylinder component of the actuator assembly and the other of which is secured to the piston.

According to an aspect of the invention, the telescoping cylinder actuator includes a port providing fluid communication with the first working chamber and the inner working chamber of the inner actuator. A spring is provided to bias a plug against the port, to seal the port and, thus, seal the first working chamber from the inner working chamber. When the piston component is moving in the first direction, should the valve gate contact something within the valve chamber causing the valve gate to stop, pressure build up within the first working chamber overcomes the spring bias force of the plug and pressure is ported into the inner working chamber, thus preventing further advancement of the valve gate.

According to an aspect of the invention, the slot valve includes a cam mechanism for sealing the valve gate once the valve gate reaches its second position, and the telescoping cylinder actuator further includes a movable plug holder that is biased in a first position toward the plug and is movable in the first direction upon engagement with the plug, so that as the piston component moves in the first direction and positions the valve gate in the second position, the plug engages the movable plug holder and the movable holder biases the plug into a sealed position closing off the port as the piston component continues to advance in the second direction to activate the cam mechanism and thereby seal the valve gate.

These and other features, objects, and advantages of the present invention will become apparent from the following description of the invention, when read in conjunction with the accompanying drawings, and the claims, which are all incorporated herein as part of the summary of the invention.

BRIEF DESCRIPTION OF THE DRAWINGS

The accompanying drawings, which are incorporated in and form a part of this specification, illustrate embodiments of the invention and, together with the description serve to explain the principles of the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
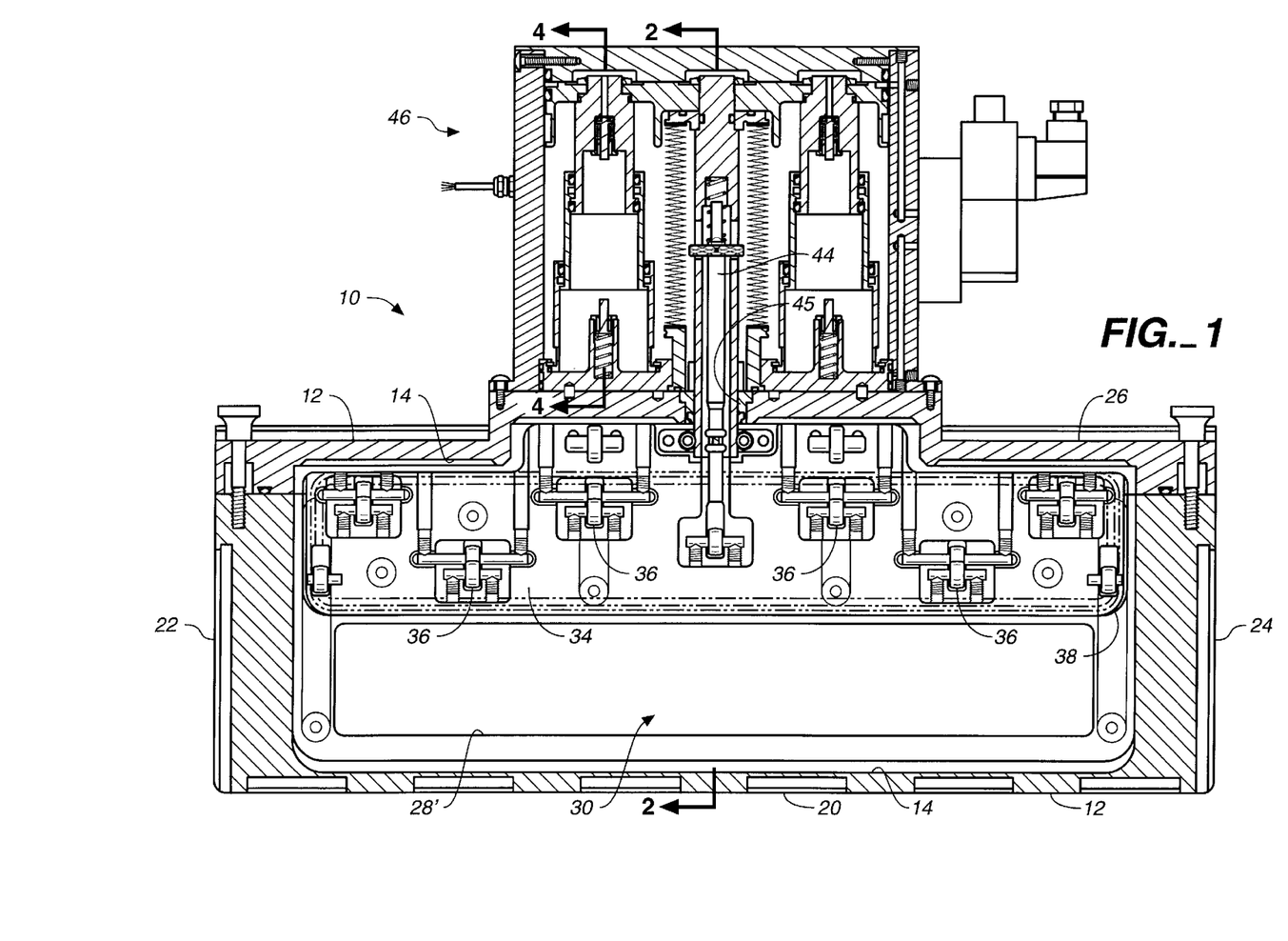
FIG. 1 is a longitudinal section view of the slot valve of the present invention.
Figure 2:
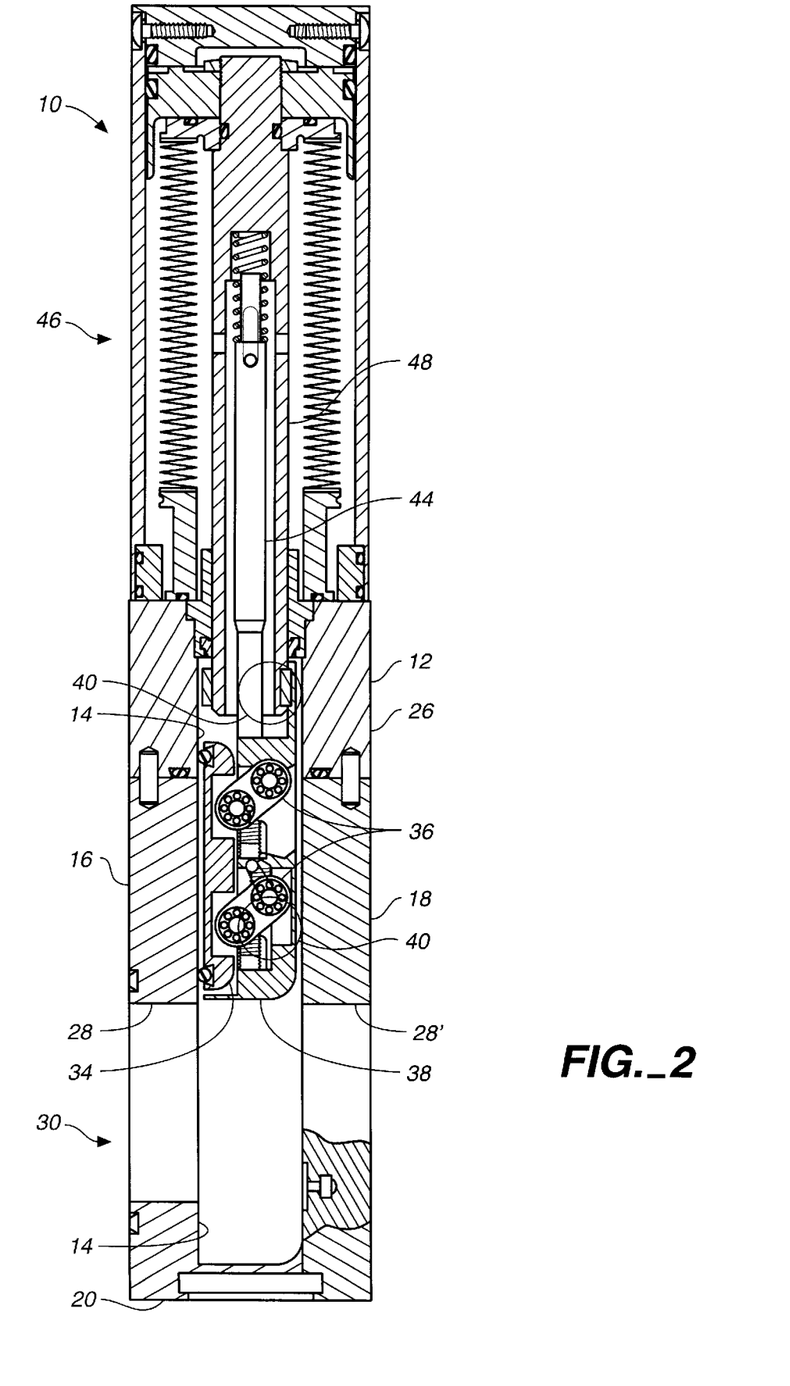
FIG. 2 is a vertical section view, taken along the line 2—2 of FIG. 1, of the slot valve.

Referring to FIGS. 1 and 2, the slot valve 10 of the present invention includes an elongated rectangular valve housing 12 that defines within its interior a valve chamber 14. Valve housing 12 includes a front plate 16, a back plate 18, a bottom 20, end walls 22, 24 and a top bonnet plate 26. Front and back plates 16, 18 include front and back aligned openings 28, 28', which together define a central opening or pathway 30 through valve housing 12. Plate components 16, 18, 20, 22, 24, 26 form a narrow profile slot valve enclosure designed to fit between adjacent process or transfer modules of an integrated processing system, with opening 30 aligned with corresponding openings in the adjacent modules.

An elongated rectangular valve gate 34 is movably carried within valve chamber 14 by means of cam supports 36, which are pivotally mounted on a backing plate 38. Rollers 40 roll up and down against the interior surface of back plate 18 and guide backing plate 38 up and down from a first position away from opening 30, as shown in FIGS. 1 and 2, to a second position where valve gate 34 is positioned to close off and preferably seal opening 28 in front plate 16.

A piston rod extension 44 extends through a top opening 45 in bonnet plate 26 and connects with cam supports 36, and a hollowed lower section of piston rod 48 extends through top opening 45 and connects with backing plate 38. Piston rod extension 44 and the lower section of piston rod 48 operate in conjunction with each other to first lower valve gate 34 to the level of opening 30 and then press the valve gate against the interior wall of front plate 16, in a manner similar to current valve gate designs well known in the art.

The design of valve housing 12 is similar to that of the valve housing portion of the rectangular slot valve currently available from my company High Vacuum Apparatus, Hayward, Calif., USA, and sold as model 22000 Series. The present invention resides in the improved, compact design of actuator assembly 46. Accordingly, it is believed that the design and operation of the valve housing, including the valve gate and cam mechanism is well understood by those skilled in the art.

Figure 3:
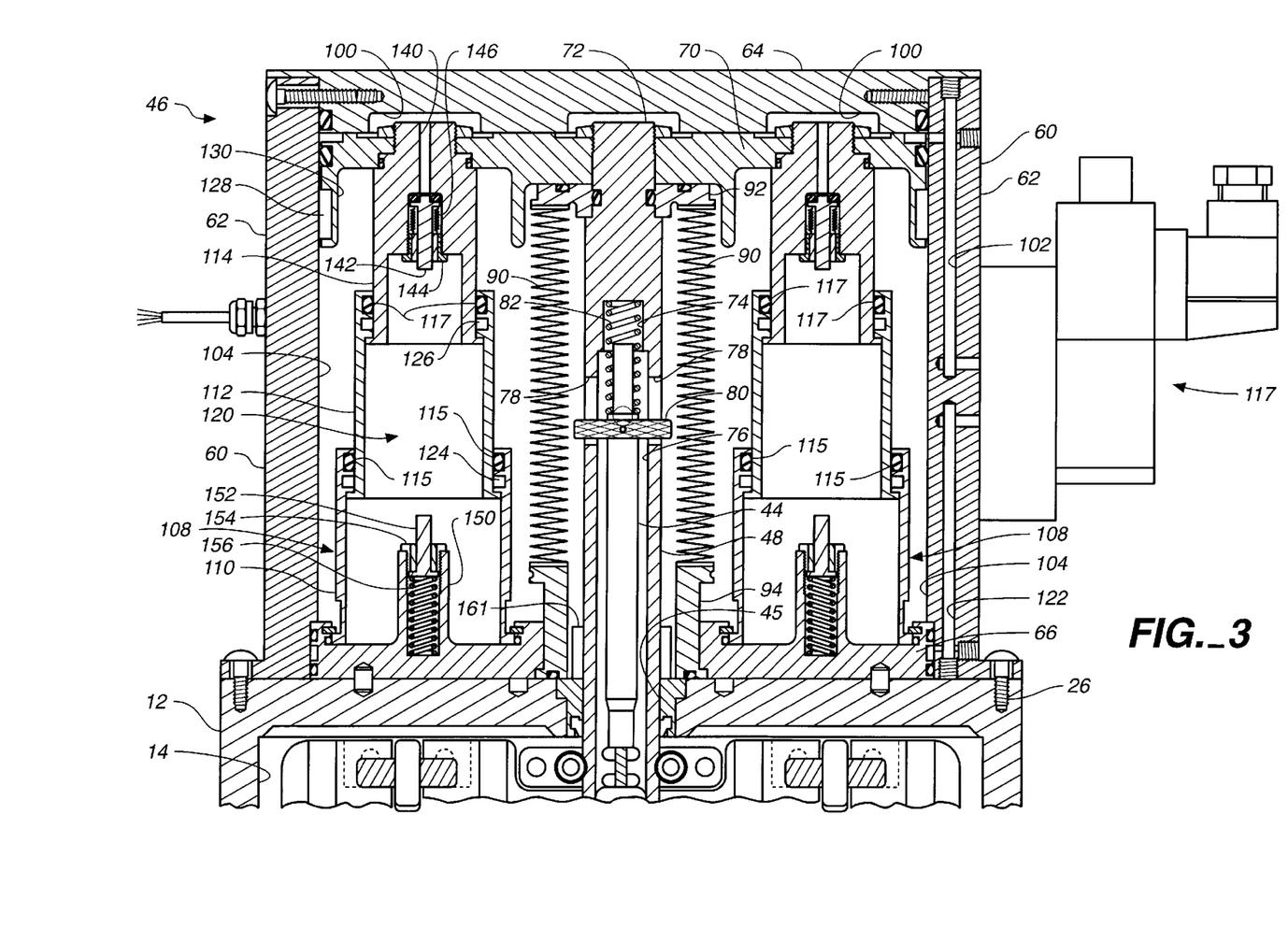
FIG. 3 is an enlarged longitudinal section view of the actuator for the slot valve.
Figure 4:
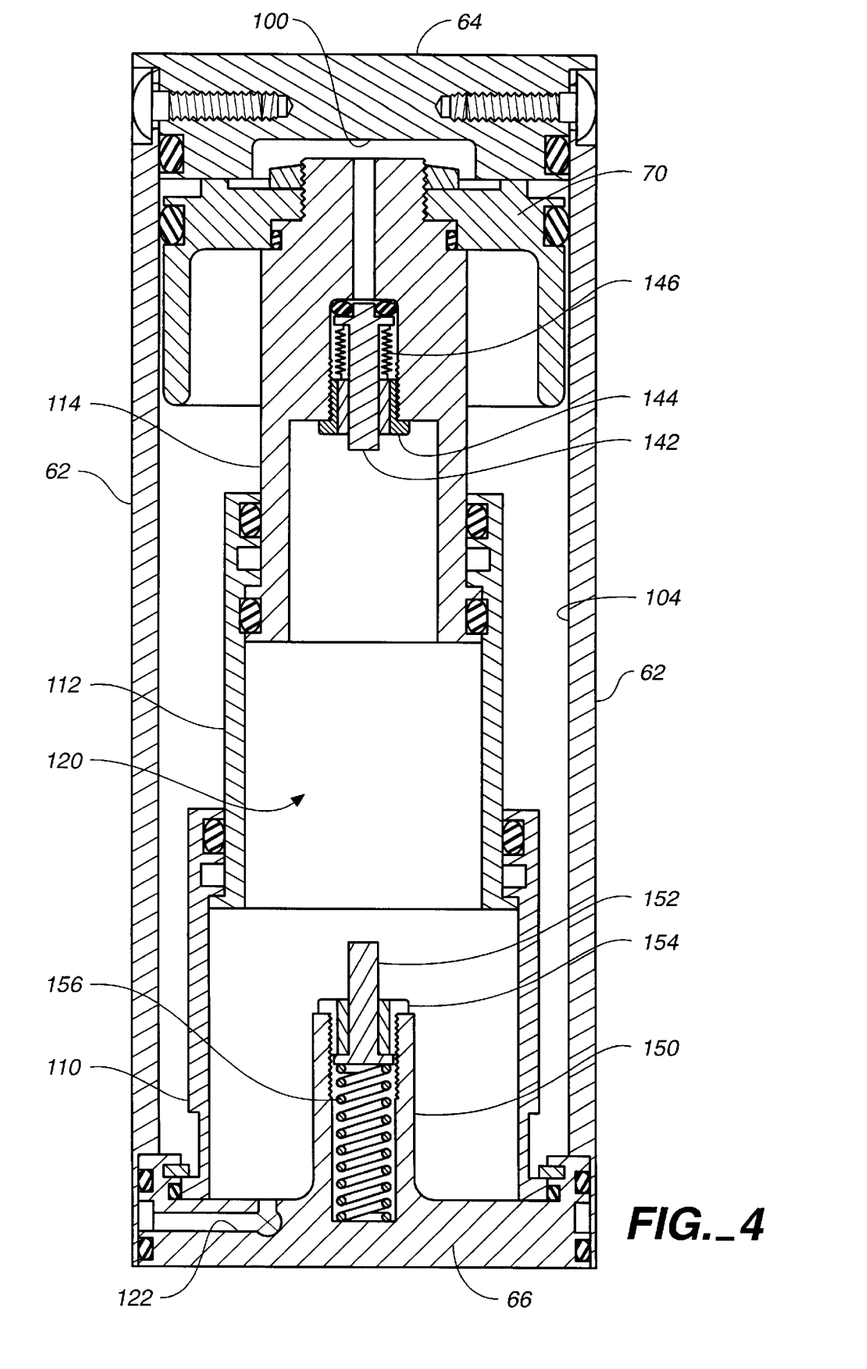
FIG. 4 is vertical section view, taken along the line 4—4 of FIG. 1, of the actuator for the slot valve.

Actuator assembly 46 is shown in greater detail in FIGS. 3 and 4. A rectangular cylinder component 60 is comprised of side walls 62, a top end wall 64, and an inner end wall 66. A piston component is comprised of a piston head 70 and a piston rod 72. Piston rod 72 is solid for an initial length from piston head 70, but then becomes hollow, first by an short, small diameter bore 74 and then by a longer, large diameter bore 76, which extends the rest of the length of piston rod 72 and defines lower piston rod section 48. The lower end of hollow section 48 is secured to the backing plate supporting the valve gate. Hollow section 48 includes a pair of opposed and aligned slots 78, in which is positioned a lost motion pin connector 80, which in turn is secured within piston rod extension 44. A spring 82 biases piston rod extension 44 downwardly out of small bore 74 so that pin connector 80 contacts the lower edges of aligned slots 78. Similar lost motion piston rods and rod extensions are currently used on valve gate designs and I make no claim to exclusive rights to this feature of my new slot valve design.

A flexible and compressible bellows shield 90 surrounds piston rod 72. A first annular collar 92 secures one end of bellows shield 90 to the upper end of piston rod 72 and a second, larger annular collar 94 secures the other end of bellows shield 90 to cylinder end wall 66. Bellows shield 90 is an expandable steel bellows made from welded annular rings.

Piston head 70 and cylinder component 60 define a first working chamber 100, which when connected to pressure via port 102, moves piston head 70 and piston rod 72 in a first downward direction, which extends piston rod 72 down into valve housing 12 and moves the valve gate in position over the central opening of the valve housing. A second working chamber 104 is defined between piston head 70 and cylinder end wall 66. Second working chamber is considered a "working" chamber because within it are a pair of inner actuators 108, which themselves are pressurized and function to move piston head 70 and piston rod 72 in a second upward direction that retracts piston rod 72 from within valve housing 12. The area outside of inner actuators 108 and within second working chamber 104 is not pressured for the purpose of moving the piston component. Second working chamber 104 is not pressurized in order to avoid subjecting bellows shield 90 to the increased pressure necessary to retract the piston component, which pressure can damage the bellows. Rather than pressurize second working chambers 104, inner actuators 108, themselves are pressurized and isolated from second working chamber 104, and are provided for the purpose of raising the piston component.

Inner actuators 108 are identical and each include a wide, first cylinder section 110, a second, smaller middle cylinder section 112, and a third, smallest cylinder section 114. First cylinder section 110 is secured at one end to cylinder end wall 66 and sealed thereto. The middle cylinder section 112 is sealed between the first and third cylinder sections 110, 114, and third cylinder section 114 is secured within an opening in piston head 70 and thus extends through to the first working chamber side of piston head 70. Telescoping cylinder sections 110, 112, 114 define an inner working chamber 120, which when pressurized via port 122, causes cylinder sections 110, 112, 114 to extend, thus moving piston head 70 and piston rod 72 in the second direction, to retract the piston rod.

Seals 115 provide a tight seal between first cylinder section 110 and middle cylinder section 112. Seals 117 provide a tight seal between middle cylinder section 112 and third cylinder section 114. The side walls of cylinder sections 110, 112, 114, as well as seals 115, 117, and cylinder end wall 66 collectively provide a bellows isolating structure that isolates the working pressure in inner chamber 120 from bellows shield 90. By designing this bellows isolating structure down around the bellows so that it at least partially extends along the bellows shield, the overall height of the actuator is significantly reduced.

Pneumatic controls are represented schematically by reference numeral 117. Controls 117 direct the flow of pressure through ports 102, 122, to move piston head 70. The design and operation of controls 117 should be understood by those skilled in the art and, thus, are not discussed in detail herein.

Wear rings for isolating abrasion between the piston and cylinder components are provided in three places. The first two wear rings 124, 126 are positioned in the first and second cylinder sections of each inner actuator 108. A pair of third wear rings 128 are positioned within downwardly extending collars 130 of piston head 70. The side walls of cylinder sections 112, 114 engage wear rings 124, 126 and act as guide surfaces for maintaining linear movement of the piston component. The inner surface of side walls 62 of the cylinder component engage wear rings 128 and also acts as a guide surface. It is a feature of the present invention to position the guide surfaces adjacent or along the bellows shield 90, rather than above the bellows shield, which has the advantage of shortening the height of the actuator. It is not necessary that all of the guide surfaces be positioned along the length of the bellows shield, but it is desirable to position some of the guide surfaces along the bellow's length. Prior art slot valves required guide surfaces above the bellows in order to maintain linear movement of the piston component. This had the attendant disadvantage of lengthening the actuator assembly.

The purpose of bellows shield 90 is to isolate the guide surfaces from valve chamber 14. The sliding interaction between the wear rings and the guide surfaces has a tendency to create small particulate matter, which if allowed to migrate into the valve chamber could effect the seal achieved by the valve gate and could contaminate products being fabricated in adjacent processing modules. The interengagement between piston rod 72 and the side walls of the opening 45 formed in top bonnet plate 26, through which piston rod 72 extends, is a relatively loose interengagement, with only a wiper 160 carried by a annular sleeve 161 provided. With the guide surfaces positioned within inner actuators 108 and between piston rod 70 and cylinder side walls 62, they are sufficiently isolated by bellows shield 90.

The third cylinder section 114 of each inner telescoping actuator 108 includes a port 140 that provides for fluid communication between first working chamber 100 and the inner working chamber 120 of actuator 108. The third cylinder section 114 includes a central bore section that positions a plug 142 having appropriate seals to seal off port 140. A threaded stop 144 threads into the central bore and provides a backstop for a bias spring 146, which biases plug 142 into a sealed position, as shown. When the piston component is being lowered in the first direction, the valve gate is lowered into the pathway defined by the aligned openings of the valve housing. Should the valve gate hit an object in the pathway, resistance to movement will cause a pressure build up in first working chamber 100. Since further advancement of the valve gate could damage the object, plug 142 acts as a pressure relief valve to port increased pressure into the inner working chamber 120 of actuator 108 and, thus, prevent further advancement of the piston component.

Cylinder end wall 66 includes an upstanding boss 150 for each inner actuator 108, which boss provides for the mounting of a similar plug arrangement to that of plug 142. A plug holder 152 is captured by a threaded stop 154, which threads into the central bore of boss 152. A spring 156 biases plug holder 152 outwardly toward plug 142. When the third cylinder section 114 approaches full retraction within the first cylinder section 110, plug 142 engages plug holder 152. Plug holder 152 then increasingly biases plug 142 into a sealed position, while the piston component completes its travel in the first direction. Prior to reaching the end of its stroke, piston rod 72 causes the pin connector 80 of piston rod extension 44 to engage the upper ends of aligned slots 78 and move piston rod extension 44 a final short distance, which engages the cam mechanism and seals the valve gate. The final advancement of piston rod extension 44 requires an increased pressure to overcome the resistance of the cam mechanism. An increase of pressure in first working chamber 100 would ordinarily unseat plug 142. Plug holder 152 prevents this by maintaining plug 142 in a sealed position.

Figure 5:
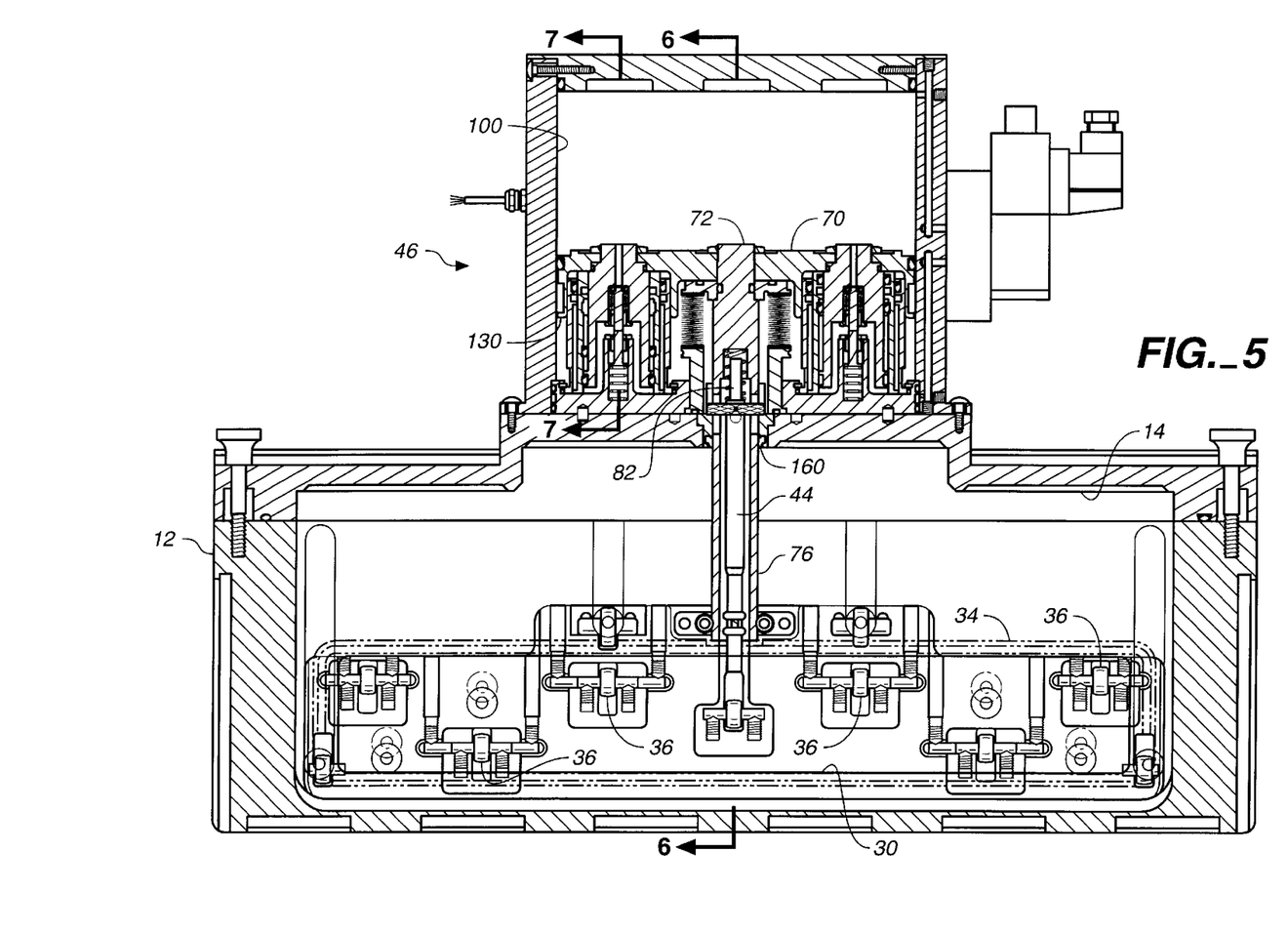
FIG. 5 is a longitudinal section view like FIG. 1 showing the valve gate in a closed position.
Figure 6:
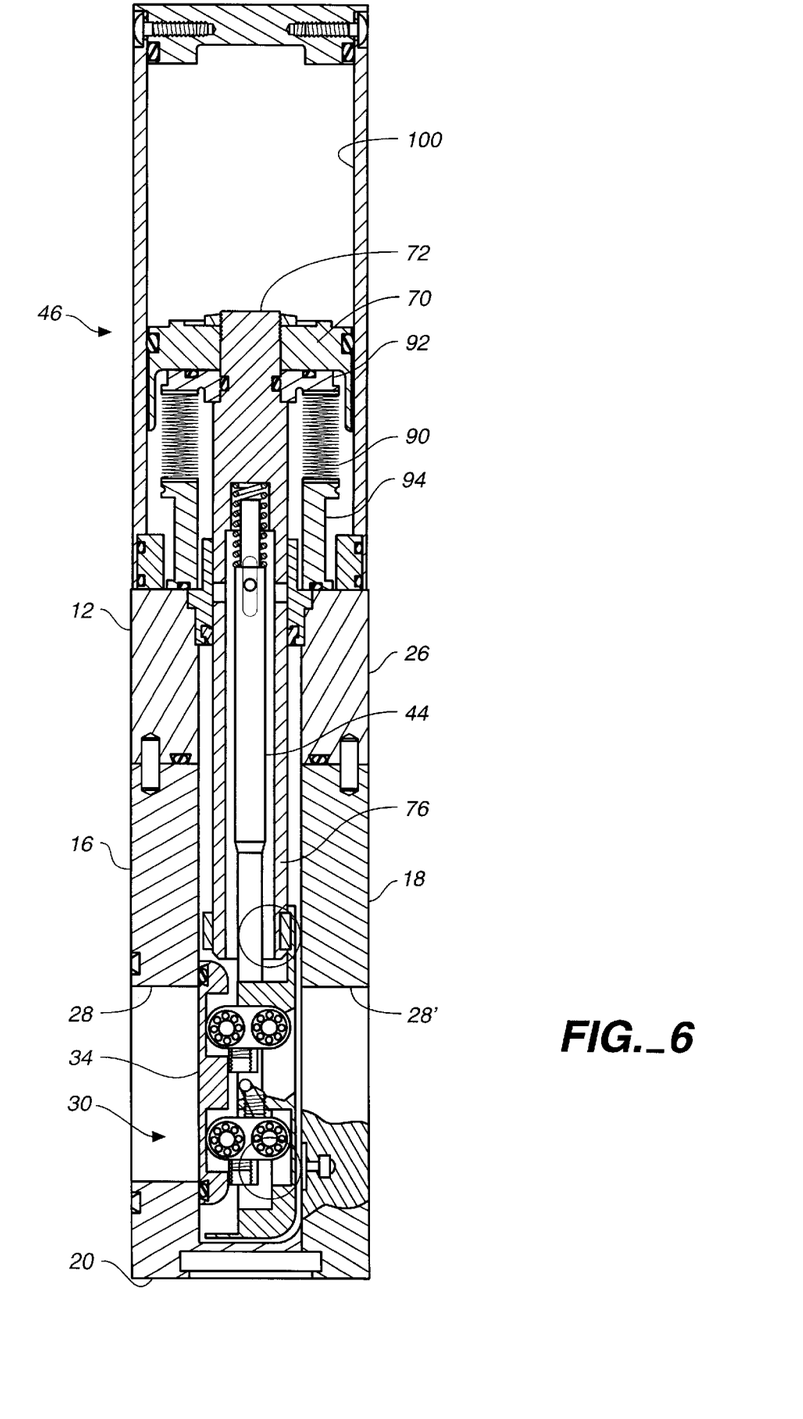
FIG. 6 is a vertical section view like FIG. 2 showing the valve gate in a closed position.
Figure 7:
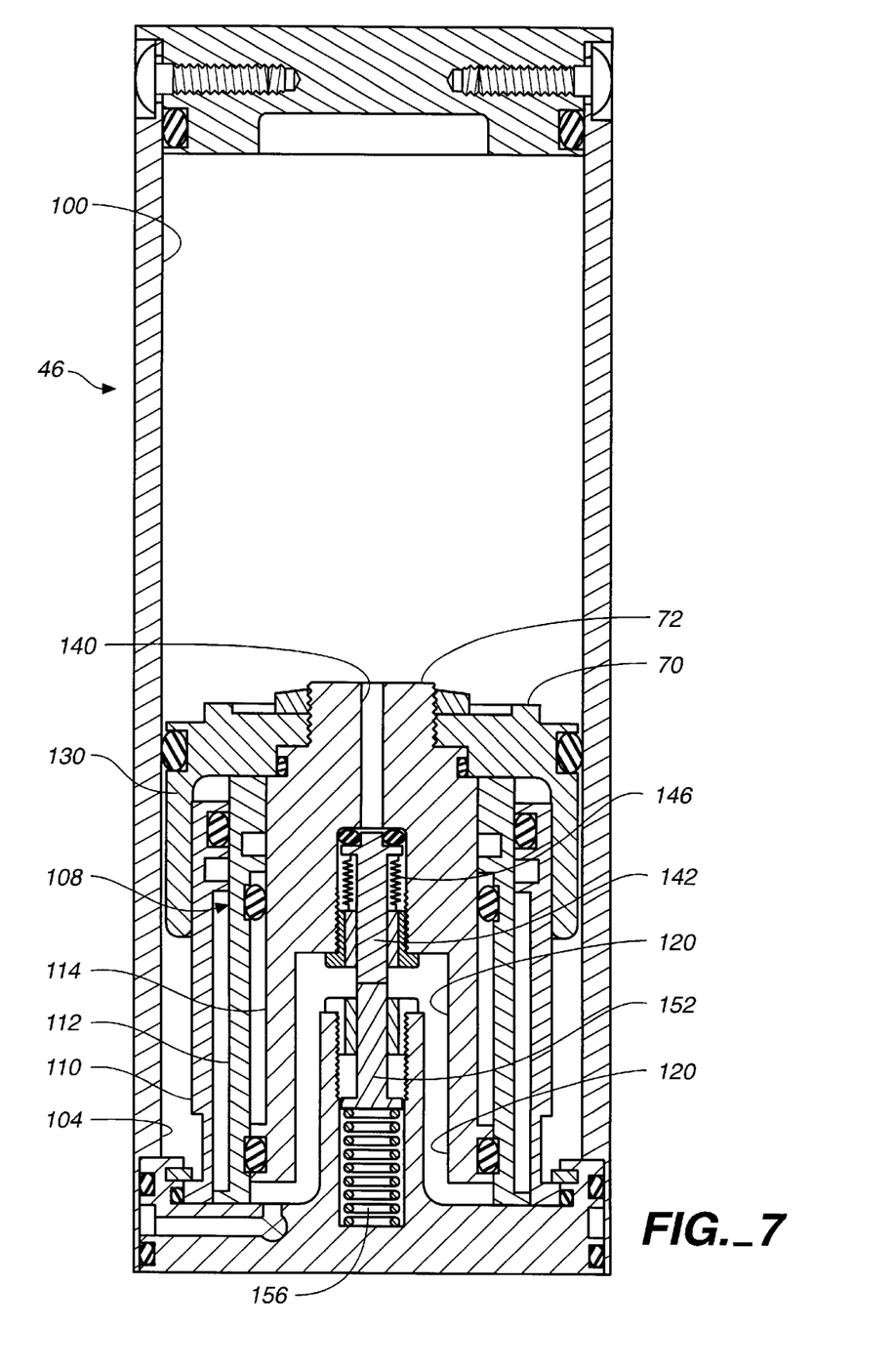
FIG. 7 is a vertical section view like FIG. 4 showing the actuator in a closed position.

FIGS. 5–7 illustrate the piston component in an extended position, having moved in the first direction to position valve gate 34 over central opening 30 and provide a vacuum seal in the valve chamber 14. When piston head 70 and piston rod 72 approach the end of their stroke, the biasing force of spring 82 acting on piston rod extension 44 provides the necessary force to overcome the resistance of cam mechanisms 36 and force valve gate 34 against the interior wall surface of front plate 16. Also, bellows shield 90 is fully compressed, yet is still in position to isolate working chamber 14 from the guide surfaces within the second working chamber 104.

As best shown in FIG. 7, inner actuators 108 are fully retracted when the piston component is fully extended. Third cylinder section 114 has moved within second cylinder section 112, which has moved within first cylinder section 110. All three cylinder sections have moved into the area between annular collar 130 of piston head 70. Plug 142 has engaged plug holder 152, which is biasing plug 142 to seal off port 140 and prevent fluid communication between first working chamber 100 and inner working chamber 120.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A vacuum valve comprising, a valve housing defining a valve chamber, the valve housing having an opening, a valve gate movable within the valve chamber from a first position away from the opening to a second position closing the opening, and an actuator assembly for moving the valve gate between its first and second positions, the actuator assembly including a cylinder component and a piston component having a piston slidably movable within the cylinder component and a piston rod extending out one end of the cylinder component and connected to the valve gate, the piston component and the cylinder component defining a first working chamber above the piston for moving the piston component in a first direction, and a second working chamber below the piston and adjacent the piston rod, the actuator assembly further including an inner actuator within the second working chamber that includes an inner working chamber for moving the piston component in a second direction, and an expandable bellows shield within the second working chamber for isolating the valve chamber from the second working chamber.

2. The vacuum valve of claim 1 wherein, side walls of the inner actuator isolate the bellows shield from the pressure of the inner working chamber of the inner actuator, and wherein the side walls extend along at least a portion of the bellows shield.

3. The vacuum valve of claim 2 wherein, the actuator assembly also includes guide surfaces for guiding the piston rod along a linear path, and the guide surfaces are part of the inner actuator and extend along at least a portion of the length of the bellows shield.

4. The vacuum valve of claim 1 wherein, the inner actuator includes a telescoping cylinder actuator.

5. The vacuum valve of claim 4 wherein, the guide surfaces are comprised of the side walls of the telescoping cylinder actuator.

6. The vacuum valve of claim 4 wherein, the telescoping cylinder actuator includes at least two cylinder sections, one of which is secured to an end wall of the cylinder component of the actuator assembly and the other of which is secured to the piston.

7. The vacuum valve of claim 4 and further comprising, a second telescoping actuator within the second working chamber for moving the piston component.

8. The vacuum valve of claim 4 wherein, the telescoping cylinder actuator includes a port providing fluid communication with the first working chamber and the inner working chamber of the inner actuator, and a plug spring biased to close the port, wherein when the piston component is moving in the first direction, should the valve gate contact something within the valve chamber causing the valve gate to stop, pressure build up within the first working chamber overcomes the spring bias force of the plug and pressure is ported into the inner working chamber.

9. The vaccum valve of claim 8 wherein, the vacuum valve includes a cam mechanism for sealing the valve gate once the valve gate reaches its second position, and the telescoping cylinder actuator further includes a movable plug holder that is biased in a first position toward the plug and is movable in the first direction upon engagement with the plug, so that as the piston component moves in the first direction and positions the valve gate in the second position, the plug engages the movable plug holder and the movable holder biases the plug into a sealed position closing off the port as the piston component continues to advance in the second direction to activate the cam mechanism and thereby seal the valve gate.

10. A slot valve for creating a vacuum tight seal to a vacuum chamber, comprising a valve housing defining a valve chamber, the valve chamber having an opening therein for providing access to the vacuum chamber, a valve gate movable within the valve chamber from a first, open position away from the opening to a second, closed position wherein the valve gate closes the opening to the vacuum chamber, an actuator assembly including a movable piston component that is connected at one end to the valve gate and a cylinder component connected to the valve housing, the piston component and the cylinder component defining a first working chamber for moving the piston component in a first direction and a second working chamber on the piston rod side of the piston, a bellows shield extending between the piston component and the cylinder component for isolating the second working chamber from the valve chamber, the actuator assembly including bellows isolating structure that isolates the working pressure region of the second working chamber from the bellows shield, the bellows isolating structure extending along at least a portion of the bellows shield, the bellows isolating structure and bellows shield being positioned within the actuator assembly and out of the valve chamber.

11. The slot valve of claim 10 wherein, the bellows isolating structure includes an inner actuator within the second working chamber, the inner actuator including a working chamber that is isolated from the bellows shield by the side walls of the inner actuator.

12. The slot valve of claim 11 wherein, the inner actuator includes a telescoping cylinder actuator with at least two cylinder sections.

13. The slot valve of claim 12 wherein, the cylinder sections provide guide surfaces for guiding linear movement of the piston component, and wherein the guide surfaces include the side walls of the cylinder sections.

14. The slot valve of claim 13, wherein, the guide surfaces further include the side walls of the cylinder component and wherein a wear ring is provided on the piston.

15. The slot valve of claim 12, wherein the telescoping cylinder actuator includes a port providing fluid communication with the first working chamber and the working chamber of the inner actuator, and a plug spring biased to close the port, wherein when the piston component is moving in the first direction, should the valve gate contact something within the valve chamber hindering movement of the valve gate, pressure build up within the first working chamber overcomes the spring bias force of the plug and pressure is ported into the working chamber of the inner actuator.

16. The vacuum valve of claim 15, wherein the vacuum valve includes a cam mechanism for sealing the valve gate once the valve gate reaches its second position, and the telescoping cylinder actuator further includes a movable plug holder that is biased in a first position toward the plug and is movable in the first direction upon engagement with the plug, so that as the piston component moves in the first direction and positions the valve gate in the second position, the plug engages the movable plug holder and the movable holder biases the plug into a sealed position closing off the port as the piston component continues to advance in the second direction to activate the cam mechanism and thereby seal the valve gate.

17. The slot valve of claim 10 and further comprising, a guide surface within the second working chamber of the cylinder component for guiding linear movement of the piston component, and the guide surface extends along at least a portion of the length of the bellows shield.

\* \* \* \* \*